United States Patent
Tacke-Willemsen et al.

(10) Patent No.: US 6,376,075 B1
(45) Date of Patent: Apr. 23, 2002

(54) ARTICLE HAVING REFLECTING COATING AND PROCESS FOR THE MANUFACTURE

(75) Inventors: Augustina M. Tacke-Willemsen, Bergen op Zoom (NL); Kurt Pratnecker, Hochwolkersdorf (AT)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/596,300

(22) Filed: Jun. 17, 2000

(51) Int. Cl.⁷ .................................................. B32B 5/16
(52) U.S. Cl. ........................ 428/402; 428/403; 428/404; 428/412; 427/203; 427/204; 427/205; 427/212; 427/213.31; 427/106; 427/415; 427/436
(58) Field of Search ................................ 428/402, 403, 428/404, 412; 106/415, 436; 427/203, 204, 205, 212, 213.31

(56) References Cited

U.S. PATENT DOCUMENTS

| | | | | |
|---|---|---|---|---|
| 4,509,988 A | * | 4/1985 | Bernhard | 106/418 |
| 4,565,581 A | * | 1/1986 | Bernhard | 106/417 |
| 4,598,015 A | * | 7/1986 | Panush | 428/324 |
| 5,135,812 A | * | 8/1992 | Phillips | 428/403 |
| 5,389,434 A | * | 2/1995 | Chamberlain | 428/323 |
| 5,571,624 A | * | 11/1996 | Phillips | 428/403 |
| 5,972,098 A | * | 10/1999 | Andes | 106/436 |
| 5,972,525 A | * | 10/1999 | Moni | 428/632 |
| 6,150,022 A | * | 11/2000 | Coulter | 428/403 |
| 6,246,523 B1 | * | 6/2001 | Bradley | 358/585 |

FOREIGN PATENT DOCUMENTS

| | | |
|---|---|---|
| DE | A 19618569 | 11/1997 |
| EP | B 548822 | 6/1993 |
| EP | B548822 | * 6/1993 |

* cited by examiner

Primary Examiner—Leszek Kiliman

(57) ABSTRACT

Described is an object having a coating on at least one of its surfaces over at least part of its area comprising IR reflecting particles which comprise at least two titanium dioxide layer applied on a flake like carrier and a suitable binder material and a method for manufacturing of such object.

10 Claims, 2 Drawing Sheets

ARTICLE HAVING REFLECTING COATING AND PROCESS FOR THE MANUFACTURE

BACKGROUND OF THE INVENTION

The invention relates to an object, which is transparent for visible light and reflects infrared radiation, comprising a transparent plastic substrate coated with an infrared light reflecting coating, wherein the coating comprises IR reflecting particles which comprise a titanium dioxide layer applied on a flake like carrier.

The invention also relates to a process for the manufacture of such object.

EP-B-548822 describes plastic objects comprising a rigid amorphous base material made of a light-transmissive synthetic material and a coating layer with IR reflecting particles. EP-B-548822 deals with objects that have a transmission in the visible range (T) of 45 to 75% and a total energy transmissivity (g) of 30 to 60% in respect of radiation energy and a solar factor according to DIN 67507, expressed by the ratio T/g of more than 1.15. To obtain the above described optical properties it is according to EP-B-548 822 necessary to use in the coating layer red IR reflecting particles which comprise one titanium dioxide layer of a thickness of 60 to 120 nanometer, applied onto a flake like carrier.

The objects of EP-B-548822 have the disadvantage that they show a pronounced color flip flop, which is undesirable for many applications. The expression "color flip flop" is used to describe the following: upon looking under different angles at the coated surface of the products of EP-B-548822 the color changes. This is called color flip flop. Looking at an angle of 90° the color is in the case of the products of EP-B-5488222 red. Looking at the surface under a very small angle of a few degrees the color is light green. At intermediate angles occurs a shift in color.

SUMMARY OF THE INVENTION

The present invention deals with objects of the kind described in EP-B-548822 which do not show or hardly show the above described color flip flop.

The present invention further deals with a very simple process for the manufacture of the claimed objects.

The objects of the invention are provided with an IR reflecting coating comprising IR reflecting particles comprising at least two titanium dioxide layers applied on a flake like carrier.

By proper selection of all relevant parameters it is possible to obtain objects with the same good optical properties as the products of EP-B-548822, but which do not or hardly show the color flip flop of the products of EP-B-548822.

The following parameters are in this respect of relevance to determine the optical properties of the object of the invention.

1) thickness of the coating and concentration of IR reflecting particles in the coating;
2) thickness and number of titanium dioxide layers on the flake like carrier;
3) particle dimensions of the flake like carrier;
4) orientation of the IR reflecting particles;
5) characteristics of the binder in the coating;
6) characteristics of the substrate.

DETAILED DESCRIPTION

The infrared reflecting particles used in the coating of the objects of the invention are known as such. They have been described for example in DE-A-19618569. The infrared reflecting particles used in the coating of the objects of the invention differ with respect to the particles used in the coating of EP-B-548822 in that they have more than one layer of titanium dioxide, which has been applied upon a flake like carrier. The titanium dioxide layers are separated from one another by layers with a refractive index, which is different from the refractive index of the titanium dioxide. Suitable layers can be made of $SiO_2$, $AL_2O_3$ and the like. The titanium dioxide layers and the separating layers are applied upon a flake like carrier. The flake like carrier can be made for example of aluminium flakes or mica flakes.

The dimensions of the flakes can be varied within broad ranges. The thickness will usually be selected between 100 and 3000 nanometer, more preferably between about 200 and 2000 nanometer. The diameter will usually vary between 5–200 micrometer, more preferably between 5–100 micrometer. Smaller diameters usually result in less transmission for visible light.

The thickness of the titanium dioxide layers on the carrier can also vary. Suitable ranges for each titanium layer vary between 50 and 150 nanometer, more preferably between 80 and 120 nanometer.

The number of titanium dioxide layers should be at least two. It can be for example two, three, four, five or more. The number is preferably two.

Suitable infrared reflecting particles are commercially available for example form Merck KgaA under the designation Iriodin AC 870.

The coating composition comprises besides the infrared reflecting particles usually a binder. Suitable binders are polymeric materials. They can be made for example of polymerisates of acrylic or methacrylic esters, polycarbonates, polyurethanes, polyesters, polystyrene and polyvinylchloride. The binder is most preferably transparent for visible light. The choice of the binder will depend upon the chemical nature of the substrate and the process for applying the coating on the substrate. For substrates made out of polycarbonate it is preferred, in particular when the coating is applied by coextrusion, to use a polycarbonate binder.

The concentration of the infrared reflecting particles in the coating can vary within broad ranges. To achieve optimal optical properties a higher concentration of infrared reflecting particles can be combined with a relatively thin layer of the coating or a lower concentration of infrared reflecting particles can be combined with a relatively thick layer of the coating.

The concentration of the infrared reflecting particles in the coating will usually vary between 10–50, more preferably 20–40% by weight (on the basis of the dry weight of the coating).

The thickness of the coating on the substrate can vary between 1 to 100, more preferably 5–50 micrometer.

The coating can cover the complete surface or only a part of the surface of the object. In a preferred embodiment of the invention the objects of the present invention are flat or curved sheet or film. In said case one or both surfaces can be coated either completely or partly.

The substrate can be made out of any transparent plastic material, which is transparent for visible light. The substrate preferably has a transmission of at least 50% for visible light. The transmission depends on the material of the substrate and on the thickness thereof. Suitable materials for the substrate are the same as those mentioned above for the binder.

The substrate is preferably in the form of a flat or curved sheet or film. The sheet can be provided with many hollow channels.

Figure 1:
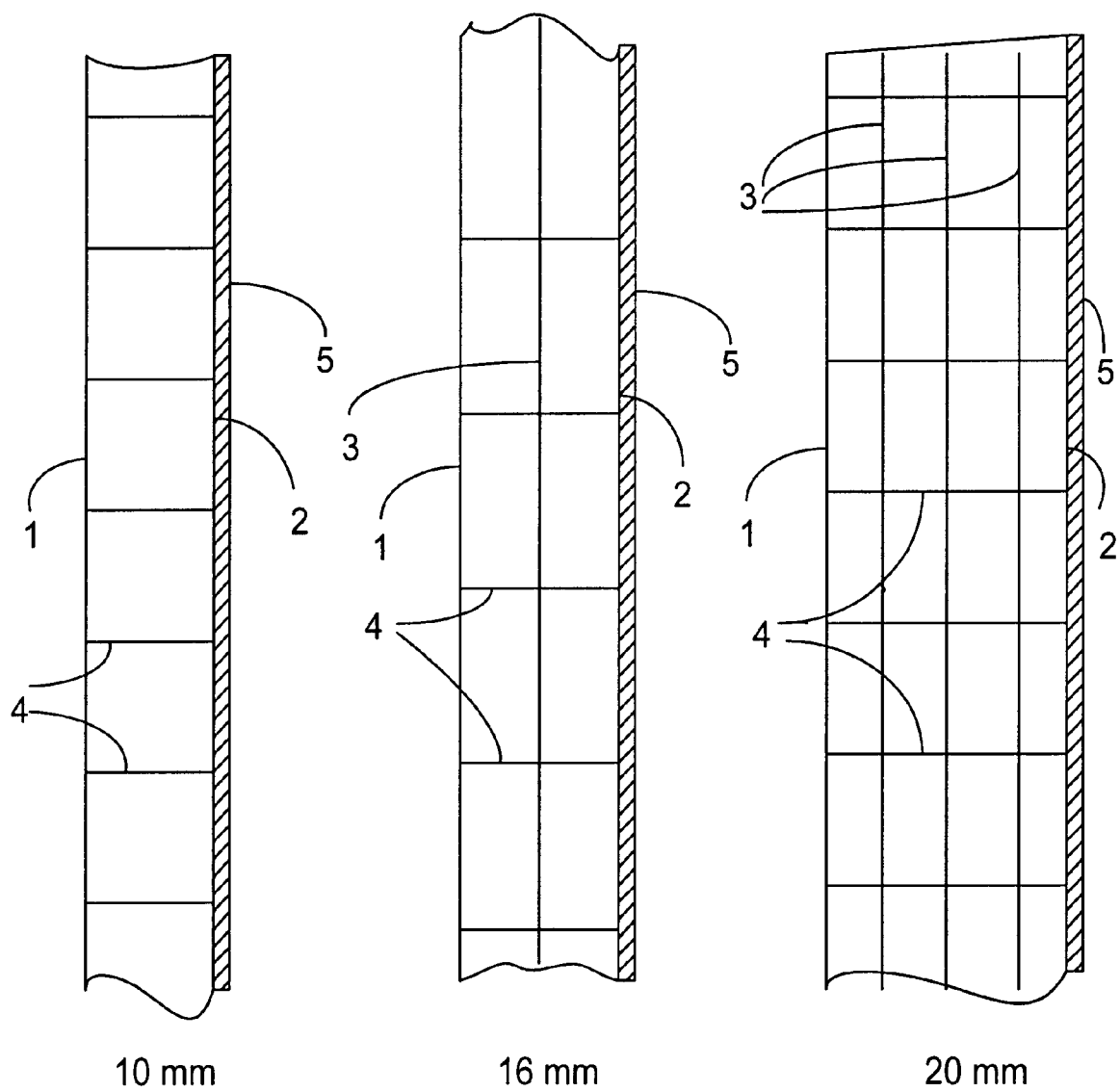
FIG. 1 shows by way of example the cross section of three objects according to the invention.

To obtain optimal benefit of the properties of the infrared reflecting particles it is of importance that they are orientated in parallel to the surface of the object according to the invention. The orientation is influenced by the way of applying the coating on the substrate. The following processes can be mentioned.

A) Roller coating. A, generally flat, substrate is brought into close proximity of a rotating roller having cavities in its surface. The cavities are filled with coating mass; the excess is scraped off and the coating is transferred to the substrate in a line contact.

B) Reverse roll coating: a coating mass is applied to a substrate to be coated; the coating mass is present in excess. The substrate and a counter rotating roll are moved relative to each other thus equalising the coating and adjusting the wet thickness thereof.

C) Screen printing: a coating mass is applied onto a substrate through a screen which is arranged parallel to the substrate and at a small spacing between the screen and the surface of the substrate. A doctor blade or squeegee is used to force the coating mass through the screen's perforations. Screen printing allows for ready patterning of the coating by selectively blocking off parts of the screen. Screen printing can be either flat bed screen printing or rotary screen printing.

D) Spray coating: a coating mass is sprayed onto a substrate with use of a spraying nozzle or gun.

Of these coating methods those which lead to a coating in which the infrared reflecting particles, which have generally a platelet form, are oriented substantially parallel to the surface of the substrate are preferred. Roller coating, reverse roll coating and screen printing give such result in general; for coatings applied in a spray process parallelity can be achieved by a suitable post treatment of the wet coating after application thereof. A post treatment can have the form of a roller treatment; reverse roll treatment or egalisation with use of a suitable squeegee or doctor blade.

In an attractive way of carrying out the method described herein before the coating type used is screen-printing whereby the following variables are controlled:

screen size doctor blade hardness concentration of infrared reflecting particles.

The applicant has carried out extensive research for determining optimal values in terms of solar factor when varying the screen size, doctor blade hardness and concentration of infrared reflecting particles applied during screen-printing.

An optimum value of the solar factor, i.e., light transmission divided by total energy transmission T/g, was obtained when the screen size is chosen in the range of 43 T, 54 T and 62 T; the doctor blade hardness is chosen from 60 and 70° shore A whereas the concentration of infrared reflecting particles is chosen between 10 and 35% on the total weight of coating mass (dry basis).

The indications 43T, 54T and 62T stand for polyester guaze having the following characteristics.

| Type | No. of threads per inch | Thread diam. in mm. | Mesh opening µm | Open area % |
|---|---|---|---|---|
| 43T | 110 | 0.077 | 150 | 43.5 |
| 54T | 137 | 0.063 | 115 | 41.75 |
| 62T | 160 | 0.054 | 97 | 41.5 |

A suitable value for the solar factor of more than 1.15 was obtained for a screen size 54 T; a doctor blade hardness of 60° shore A; and a concentration of infrared reflecting particles of at least 21 percent based on the total weight of the coating mass.

An optimum solar factor was obtained using the screen size of 54T, a doctor blade hardness of 60° shore A at a concentration of infrared reflecting particles of 25 percent based on the total weight of the coating mass.

EXAMPLE

Three multi wall sheets made out of polycarbonate with a total thickness of about 10, 16 and 20 millimetres respectively as shown in FIG. 1 were used as a transparent substrate. In FIG. 1, the outer walls are represented with 1 and 2, and in two of the three sheets an inner wall with 3. The walls are interconnected by ribs 4. The optical transmission for visible light (T), the total transmission for radiation energy (g) and the solar factor of the substrate prior to coating were determined in accordance with DIN 67507. The results are shown in the table here below.

Figure 2:
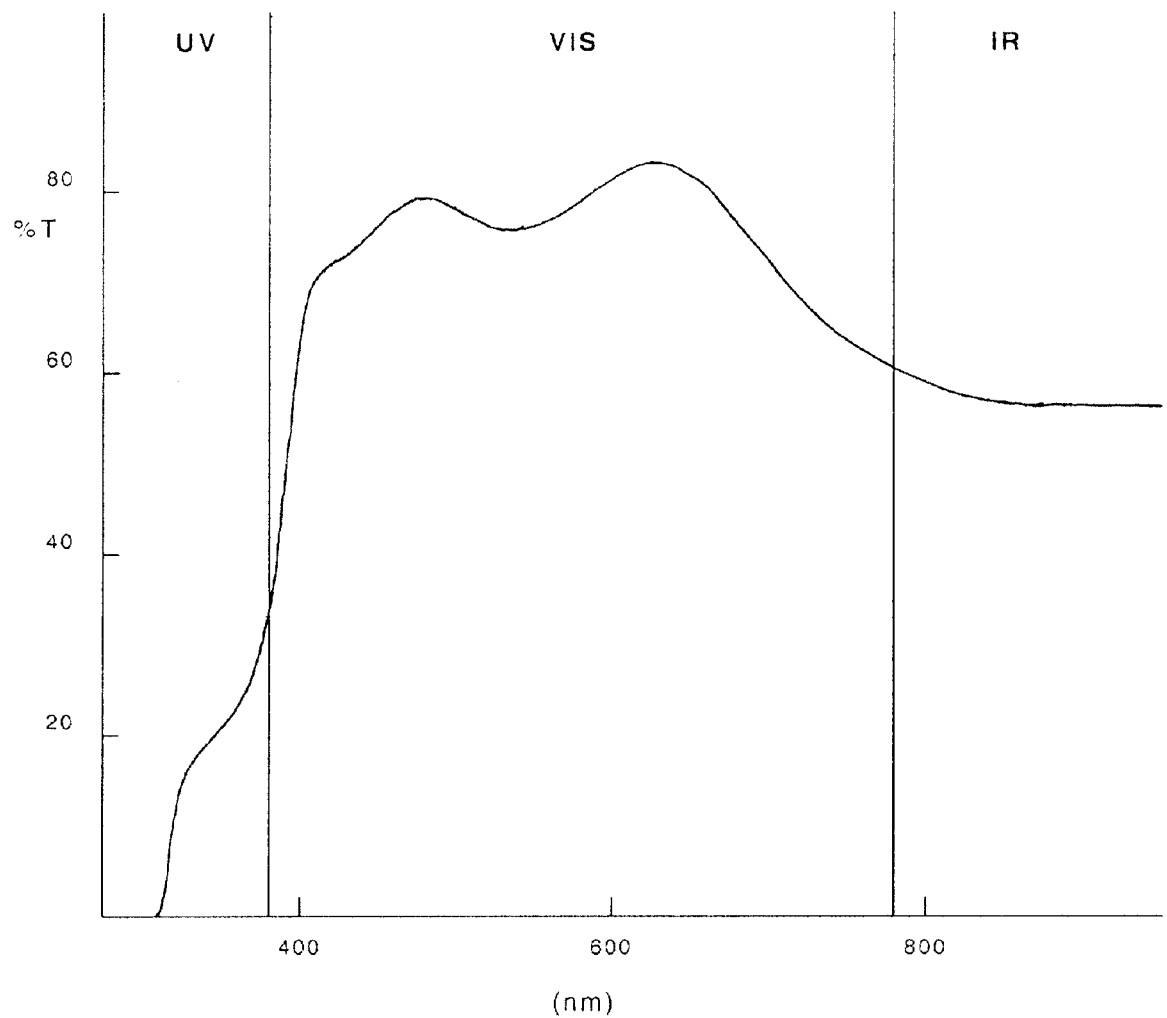
FIG. 2 shows the relative transmission of suitable infrared reflecting particles that can be used in the coating of the object of the invention.

The above substrates were coated by screen printing. The coating is indicated by numeral 5 in FIG. 1. For the screen printing an ink composition was used made by combining 25 parts by weight of a Iriodin AC 870 obtained from Merck KgaG, 75 parts by weight of a commercially available ink base (PY 383 of Sericol Ltd.), about 10 parts by weight of a thinner (Thinner ZV 557 of Sericol Ltd.) and about 10 parts by weight of a retarder (Retarder ZV558 of Sericol Ltd.). The Iriodin AC 870 was first mixed with the thinner into a paste. The obtained paste was admixed with the ink base and the retarder. Iriodin AC870 is a pigment consisting of a mica plate carrier upon which have been applied on both sides, in the indicated order, the following layers: titanium dioxide with a thickness of about 100 nanometer, silicon dioxide with a thickness of about 150 nanometer and titanium dioxide with a thickness of about 100 nanometer. A typical transmission (T) spectrum of Iriodin AC870 is shown in FIG. 2. In FIG. 2 UV means ultraviolet, VIS means visible light and IR means infrared.

The obtained ink was applied upon the substrate by screen printing by using a screen size of 54T and a Doctor blade with a hardness of 60° Shore A. The ink was dried at about 70° C. for about 80 seconds. The coating was applied in a thickness so as to obtain a coating weight of 9 gram per square meter (dry weight).

The optical properties of the coated sheet were determined. The results are represented in the following table.

TABLE

|  |  | T(%) | g(%) | T/g |
|---|---|---|---|---|
| Non coated multi wall sheet | 10 mm | 81 | 85 | 0.95 |
|  | 16 mm | 76 | 82 | 0.90 |
|  | 20 mm | 64 | 75 | 0.85 |
| Coated multi wall sheet | 10 mm | 58 | 48 | 1.21 |
|  | 16 mm | 53 | 46 | 1.15 |
|  | 20 mm | 46 | 39 | 1.18 |

The coated sheet showed hardly any color flip flop. Upon looking at the coated surface under different angles between 1 and 90° the color remained almost the same whitish color. Looking through the coated sheet also gave a whitish color. Commercially available sheets of the Röhm Company, based on the technology of EP-548822, have a pronounced color flip flop varying between light green to red. Upon transmission they have a greenish color.

What is claimed is:

1. Object, which is transparent for visible light and reflects infrared radiation, comprising a transparent plastic substrate coated with an infrared light reflecting coating that comprises IR reflecting particles with a titanium dioxide layer applied on a flake like carrier, the IR reflecting particles comprising at least two titanium dioxide layers applied on a flake like carrier.

2. Object according to claim 1 wherein the IR reflecting particles comprise a plurality of alternating $SiO_2$ and $TiO_2$ layers on mica platelets.

3. Object according to claim 1 wherein the substrate is a multi wall sheet.

4. Object according to claim 3 wherein the substrate is made out of polycarbonate.

5. Object according to claim 1 having a solar factor of at least 1.2.

6. Object according to claim 1 having a highly reduced color flip flop.

7. Method of manufacturing the object of claim 1 in which at least one surface of a suitable plastics substrate is coated with a coating mass comprising at least a suitable binder and IR reflecting particles which comprise at least two titanium dioxide layers applied on a flake like carrier, whereafter the coating mass is dried and/or cured.

8. Method according to claim 7 wherein the procedure of coating is carried out with use of roller coating, spray coating or screen-printing.

9. Method according to claim 8 wherein the coating is applied with use of screen-printing and control of the following variables:

Screen size;

Doctor blade hardness; and

Concentration of infrared reflecting particles.

10. Method according to claim 9 wherein the screen size is chosen from 43T to 62T;

the doctor blade hardness is chosen from 60 to 70 degrees Shore A; and the concentration of infrared reflecting particles is chosen between 10 and 35% on the total weight of coating mass (dry weight basis).

* * * * *